United States Patent
Benitez et al.

(10) Patent No.: US 10,663,626 B2
(45) Date of Patent: May 26, 2020

(54) ADVANCED REFRACTIVE OPTICS FOR IMMERSIVE VIRTUAL REALITY

(71) Applicant: TESSELAND LLC, Glendale, CA (US)

(72) Inventors: Pablo Benitez, Madrid (ES); Juan Carlos Minano, Madrid (ES); Marina Buljan, Madrid (ES); Dejan Grabovickic, Madrid (ES); Pablo Zamora, Madrid (ES)

(73) Assignee: TESSELAND, LLC, Madrid (ES)

( * ) Notice: Subject to any disclaimer, the term of this patent is extended or adjusted under 35 U.S.C. 154(b) by 0 days.

(21) Appl. No.: 15/545,633

(22) PCT Filed: Jan. 20, 2016

(86) PCT No.: PCT/US2016/014160
§ 371 (c)(1),
(2) Date: Jul. 21, 2017

(87) PCT Pub. No.: WO2016/118647
PCT Pub. Date: Jul. 28, 2016

(65) Prior Publication Data
US 2018/0004000 A1     Jan. 4, 2018

Related U.S. Application Data

(60) Provisional application No. 62/105,905, filed on Jan. 21, 2015, provisional application No. 62/208,235, filed on Aug. 21, 2015.

(51) Int. Cl.
*G02B 3/00*     (2006.01)
*G02B 30/24*    (2020.01)
(Continued)

(52) U.S. Cl.
CPC .......... *G02B 3/0037* (2013.01); *G02B 27/01* (2013.01); *G02B 27/0172* (2013.01);
(Continued)

(58) Field of Classification Search
USPC ................. 348/54; 349/11; 359/631, 732, 9; 345/8; 351/211; 353/8
See application file for complete search history.

(56) References Cited

U.S. PATENT DOCUMENTS

| 5,726,670 A | 3/1998 | Tabata et al. |
| 6,185,045 B1 | 2/2001 | Hanano |

(Continued)

FOREIGN PATENT DOCUMENTS

| JP | 5-84930 U | 11/1993 |
| JP | H0638219 A | 2/1994 |

(Continued)

OTHER PUBLICATIONS

International Search Report of PCT/US2016/014160, dated May 25, 2016 (dated May 25, 2016).

(Continued)

*Primary Examiner* — Thai Q Tran
*Assistant Examiner* — Syed Y Hasan
(74) *Attorney, Agent, or Firm* — Faegre Drinker Biddle & Reath LLP

(57) ABSTRACT

A display device has a display, operable to generate a real image, and an optical system, comprising one or more lenslets, arranged to generate a virtual sub-image from a partial real image on the display, by each lenslet projecting light from the display to an eye position. The sub-images combine to form a virtual image viewable from the eye position. At least one lenslet is symmetric with respect to a plane, and the display surface is cylindrical with its axis perpendicular to that plane.

10 Claims, 8 Drawing Sheets

(51) Int. Cl.
    *H04N 13/344*     (2018.01)
    *H04N 13/341*     (2018.01)
    *G02B 27/01*     (2006.01)
    *G06T 15/00*     (2011.01)
    *H04N 13/383*     (2018.01)
    *G06T 19/00*     (2011.01)
    *G02B 27/00*     (2006.01)

(52) U.S. Cl.
    CPC ............. *G02B 30/24* (2020.01); *G06T 15/00* (2013.01); *H04N 13/341* (2018.05); *H04N 13/344* (2018.05); *G02B 27/0093* (2013.01); *G02B 2027/0123* (2013.01); *G02B 2027/0134* (2013.01); *G06T 19/006* (2013.01); *H04N 13/383* (2018.05)

(56) References Cited

U.S. PATENT DOCUMENTS

| | | | |
|---|---|---|---|
| 8,384,999 B1 * | 2/2013 | Crosby | G02B 27/0172 349/11 |
| 10,032,074 B2 * | 7/2018 | Publicover | H04N 5/2256 |
| 2002/0067466 A1 * | 6/2002 | Covannon | G02B 27/0176 353/8 |
| 2002/0101568 A1 * | 8/2002 | Eberl | G02B 27/017 351/211 |
| 2002/0196554 A1 | 12/2002 | Cobb et al. | |
| 2004/0227703 A1 | 11/2004 | Lamvik et al. | |
| 2007/0030543 A1 * | 2/2007 | Javidi | G02B 30/27 359/9 |
| 2008/0049152 A1 | 2/2008 | Hong et al. | |
| 2008/0316606 A1 | 12/2008 | Inoguchi et al. | |
| 2009/0115842 A1 | 5/2009 | Saito et al. | |
| 2009/0295683 A1 | 12/2009 | Pugh et al. | |
| 2011/0043436 A1 | 2/2011 | Yamamoto | |
| 2016/0026253 A1 * | 1/2016 | Bradski | G02B 27/0172 345/8 |
| 2016/0313556 A1 | 10/2016 | Futterer | |
| 2017/0055825 A1 * | 3/2017 | Tumlinson | A61B 3/032 |

FOREIGN PATENT DOCUMENTS

| | | |
|---|---|---|
| JP | 08-160344 A | 6/1996 |
| JP | H0965245 A | 3/1997 |
| JP | H010246866 A | 9/1998 |
| JP | 2002040364 A | 2/2002 |
| JP | 2004258332 A | 9/2004 |
| JP | 2008-165063 A | 7/2008 |
| JP | 2009003128 A | 1/2009 |
| JP | 2009115906 A | 5/2009 |
| JP | 2011-145488 A | 7/2011 |
| JP | 2014503836 A | 2/2014 |
| WO | 2015077718 A1 | 5/2015 |

OTHER PUBLICATIONS

Written Opinion of the International Searching Authority of PCT/US2016/014160, dated May 25, 2016 (dated May 25, 2016).
Cheng et al., "Design of a wide-angle, lightweight head-mounted display using free-form optics tiling", Optics Letters, vol. 36, No. 11, pp. 2008-3000 (2011).
Office Action dated Aug. 5, 2019 in corresponding Chinese Application No. 201680014251.2.

* cited by examiner

ADVANCED REFRACTIVE OPTICS FOR IMMERSIVE VIRTUAL REALITY

CROSS REFERENCE TO RELATED APPLICATIONS

This application claims benefit of commonly invented and assigned U.S. Provisional Patent Applications No. 62/105,905, filed on 21 Jan. 2015, and No. 62/208,235, filed on 21 Aug. 2015. Both of those applications are incorporated herein by reference in their entirety. This application is related to WO 2015/077718 (PCT/US2014/067149) of common inventors Benitez and Miñano for "Immersive compact display glasses", referred to below as "PCT1", which is incorporated herein by reference in its entirety.

FIELD OF THE INVENTION

The application relates to visual displays, and especially to head-mounted display technology.

BACKGROUND

1. Definitions

| | |
|---|---|
| cluster | Set of active opixels that illuminates the pupil range through a given lenslet. The number of clusters coincides with that of lenslets. |
| cylinder | In the most general sense, any shape that can be generated by tracing a straight line called a "generant" or "generatrix" along a path, while keeping the generant parallel to a fixed direction. In some aspects of the present devices, the path is a circle, and the generant is perpendicular to the plane of the circle. That is the narrowest and commonest sort of "cylinder." A central axis parallel to the generant is then immediately evident. In other aspects of the present disclosure, the cylindrical display used can be a cylinder in a more general sense, and references to the "axis" then denote any convenient reference line parallel to the generant. In practical embodiments, the cylindrical surface is usually flat and/or concave towards the eye along its entire length, with a fairly smooth curve in the curved parts. |
| display | Component, usually electronic, that modulates the light spatially to produce a real image. The display can be self-emitting, such as an OLED display, or externally illuminated by a front or a backlight system, such as an LCD or an LCOS. The display may be a digital display that forms a real image from an array of distinct pixels. |
| eye pupil | Image of the interior iris edge through the eye cornea seen from the exterior of the eye. In visual optics, it is referenced to as the input pupil of the optical system of the eye. Its boundary is typically a circle from 3 to 7 mm diameter depending on the illumination level. |
| eye sphere | Sphere centered at the approximate center of the eye rotations and with radius the average distance of the eye pupil to that center (typically 13 mm). |
| field of view | Field of View; defined as the horizontal and vertical full angles subtended by the virtual screen from the eye pupil center when the two eyes rest looking frontwards. |
| fixation point | Point of the scene that is imaged by the eye at center of the fovea, which is the highest resolution area of the retina. |
| freeform surface | Surface that does not have rotational or linear symmetry. It may have one or more planes of symmetry. |
| gaze vector | Unit vector of the direction linking the center of the eye pupil and the fixation point. |
| gazed region of virtual screen | Region of the virtual screen containing the fixation points for all positions of the eye pupil within the union of the pupil ranges. It contains all the ipixels that can be gazed. |
| guard | Corridor between adjacent clusters of the digital display that contains no active opixels. The guard avoids optical cross-talk while guaranteeing certain tolerance for the optics positioning. |
| human angular resolution | Minimum angle subtended by two point sources which are distinguishable by an average perfect-vision human eye. The angular resolution is a function of the peripheral angle and of the illumination level. |
| inactive area | Region of the digital display in which the opixels are inactive. |
| ipixel | Virtual image of the opixels belonging to the same web. Preferably, this virtual image is formed at a certain distance from the eye (from 2 m to infinity). It can also be considered as the pixel of the virtual screen seen by the eye. |
| lenslet | Each one of the individual optical devices of the optics array, which collects light from the digital display and projects it to the eye sphere. The lenslet is designed to form a continuous image of opixels into ipixels. Each lenslet may be formed by one or more optical surfaces. There is one lenslet per cluster and, in time multiplexing, one shutter (or equivalent) per lenslet. |
| opixel | Physical pixel of the digital display. There are active opixels, which are lit to contribute to the displayed image, and inactive opixels, which are never lit. An inactive opixel can be physically nonexistent, for instance, because the display lacks at that opixel position at least one necessary hardware element (OLED material, electrical connection) to make it functional, or it can be unaddressed by software. The use of inactive opixels reduces the power consumption and the amount of information to be managed. |
| optical cross-talk | Undesired situation in which one opixel is imaged into more than one ipixel. |
| outer region of virtual screen | Region of the virtual screen formed by the ipixels which do not belong to the gazed region of virtual screen, i.e., it is formed by ipixels that can be seen only at peripheral angles greater than zero. |

1. Definitions

| | |
|---|---|
| peripheral angle | Angle formed by a certain direction and the gaze vector. |
| pupil range | 1. Region of the eye sphere illuminated by a single cluster through its corresponding lenslet. When the eye pupil intersects the pupil range of a given lenslet, then the image corresponding to its corresponding cluster is projected on the retina. For a practical immersive design, a pupil range comprising a circle of 15 degrees full angle on the eye sphere is sufficient. 2. The union of all pupil ranges corresponding to all lenslets of the array. It is a spherical shell to a good approximation. If all accessible eye pupil positions for an average human are considered, the boundary of the union of eye pupil ranges is approximately an ellipse with angular horizontal semi-axis of 60 degrees and vertical semi-axis of 45 degrees relative to the front direction. |
| surface S1 | Refractive surface of the lenslet array that is closer to the digital display. |
| surface S2 | Refractive surface of the lenslet array that is closer to the eye. |
| virtual screen | Surface containing the ipixels, preferably being a region of the surface of a sphere concentric with the eye and with radius in the range from 2 m to infinity. |
| web | Set of active opixels displaying information of the same ipixel. |

2. State of the Art

Head mounted display technology is a rapidly developing area. One aspect of head mounted display technology is that it provides a full immersive visual environment (which can be described as virtual reality), such that the user only observes the images provided by one or more displays, while the outside environment is visually blocked. These devices have application in areas such as entertainment, gaming, military, medicine and industry.

A head mounted display consists typically in one or two displays, their corresponding optical systems, which image the displays into a virtual screen to be visualized by the user's eye, and a helmet that visually blocks the external environment and provides structural support to the mentioned components. The display may also have a pupil tracker and/or a head tracker, such that the image provided by the display changes according to the user's movement.

An ideal head mounted display combines a high resolution, a large field of view, a low and well-distributed weight, and a structure with small dimensions. Although some technologies successfully achieve these desired features individually, so far no known technology has been able to combine all of them. That results in an incomplete or even uncomfortable experience for the user. Problems may include a low degree of realism and eye strain (low resolution or optics imaging quality), failure to create an immersive environment (small field of view), or excessive pressure on the user's head (excessive weight).

U.S. Pat. No. 5,390,047 by Mizukawa describes a stereo viewer, the holding package of conventional rotationally symmetric lenses for accommodating stereoscopic photographs and the stereoscopic photographs. The distance between the binocular lenses and the stereoscopic photographs can be changed so that the user views the stereoscopic photographs three-dimensionally.

The particular case of a 3D viewer with a single large display for both eyes and two lenses (one per eye) is presented in US Pat. application no. US 2010/0277575 A1 by Ismael et al. This patent application shows a method and apparatus that provide a 3D image and/or a 3D video via a handheld media player (e.g. an IPod®, a personal digital assistant (PDA), a cell phone, an IPhone®, or other portable devices capable of displaying images).

HMD configuration with one digital display for both eyes is especially attractive for commercial digital displays made with low cost backplane technology of about 5.7" (145 mm) diagonal. This kind of digital display presents a lateral length of 126 mm, which is about double the average human interpupil distance of 63 mm. This is explained through FIG. 1, showing a schematic view from above, where the two eye spheres 101 are separated by the interpupil distance 105. The digital display 103 emits light, which is deflected by the lenses 102 and sent to the user's eyes. Since half the lateral length of the digital display, i.e. 104, equals the interpupil distance 105, lenses 102 can be designed symmetrically left-right in the figure, since the cone of light received from their corresponding half of digital display will be symmetrical. Dashed line 106 indicates the symmetry axis of the digital display.

The displays may be of the type called Light Field Displays (F. Huang, K. Chen, G. Wetzstein. "The Light Field Stereoscope: Immersive Computer Graphics via Factored Near-Eye Light Field Displays with Focus Cues", ACM SIGGRAPH (Transactions on Graphics 33, 5), 2015) implemented by stacked (transmissive) LCDs. Particularly interesting because of its thickness is the case of just 2 stacked LCDs with a separator between them. Light Field Displays support focus cues which together with the rest of the device help to solve the vergence-accommodation conflict at a reasonable cost and volume.

One approach used to increase the field of view while maintaining a high resolution is tiling, i.e. using multiple displays per eye arranged in a mosaic pattern, and not in the same plane. That approach is presented in the reference: J. E. Meizer, "Overcoming the Field of View: Resolution Invariant in Head Mounted Displays", SPIE Vol. 3362, 1998, or D. Cheng et al., "Design of a wide-angle, lightweight head-mounted display using free-form optics tiling," Opt. Lett. 36, 2098-2100 (2011). Cheng et al. describes optical tiling for a freeform see-through optical system. The U.S. Pat. No. 6,529,331 B2 to Massof et al. also presents an optical tiling solution for virtual reality head mounted display and focal distances around 22 mm.

The horizontal field of view can be enlarged by partial binocular overlap as described in J. E. Meizer, K. Moffitt, "Partial binocular-overlap in helmet-mounted displays," Proc. SPIE 1117, 56-62, 1989. By partial overlap the human vision is replicated with a central region of binocular overlap and outer monocular regions. The optical system that works with one eye is physically tilted inwards for convergent overlap or outwards for divergent overlap. Optical performance of the overlap region is of great importance. Binocular alignment, focus and distortion correction have to be applied.

U.S. Pat. No. 4,154,514 to Harvey describes a motion picture projecting system made of a single projector with an anamorphic lens, an ordinary standard 35 mm anamorphic film and a deeply curved screen. This projection system claims to give a viewer improved depth of perception. Curved lenticular screen surface occupies an arc corresponding to about 146 degrees of a circle while the ratio of screen width in proportion to screen height is of the order of 2.25 to 1 (see schematic view of both schematic top and schematic side views in FIG. 2). The horizontal and vertical dimensions of Harvey's screen approximate an estimated average field of vision, at approximately 160 degrees in a horizontal sense and 60 degrees in a vertical sense.

Some of the embodiments herein use optics composed by several lenslet units to project the light from the digital display to the eye. PCT1 application, which has common inventors to this one, discloses concepts that are related to those embodiments, as clusters, opixels and ipixels. FIG. 3 (which is also FIG. 3 in PCT1) shows a simple example with only four clusters 304t, 304b, 305t and 305b, which form the compound image created by opixels on the digital display 307. The opixels are projected by the lenslet array optics to form the image of ipixels on the virtual screen 308 (which for simplicity has been drawn here flat with a rectangular contour). Therefore, every opixel belongs to a single cluster and the intersection of any two clusters is the empty set and the union of all clusters is the whole digital display.

Each cluster displays a portion of the image on the virtual screen. Adjacent clusters display portions of the image with a certain shift that coincides in the neighboring regions. In order to explain why this is necessary, a two-dimensional schematic drawing has been added at the top of FIG. 3. It shows the relevant rays to define the edges of the mapping between opixels and ipixels. In this drawing, the virtual screen with the ipixels is placed at infinity, so the direction of rays 300a, 301a, 302a, and 303a indicates the ipixel positions on the virtual screen. The drawing is two-dimensional for simplicity, but the actual device that projects the image on the bottom left in FIG. 3 is three-dimensional and contains four lenslets, two above and two below, and not only the two shown as 304 and 305 in the schematic drawing on the top of FIG. 3. The two-dimensional scheme is used to explain the horizontal coordinates of the mapping between opixels and ipixels, and an analogous reasoning applies to the vertical coordinates.

The horizontal extent of the virtual screen extends from 300a to 303a. The portion of the image represented in the left clusters 304t and 304b is given by the edge rays 300a and 302a reaching the edges of the pupil range 306, which define the vertical lines 300a and 302a on the virtual screen 308. Analogously, the portion of the image represented in the right clusters 305t and 305b is given by the edge rays 301a and 303a, which define two vertical lines on the virtual screen 308. Therefore, the portion of the virtual screen 308 between 301a and 302a will be displayed in both left clusters and right clusters.

Specifically, lenslet 304 maps edge rays 300a and 302a of the virtual screen onto 300b and 302b on the digital display 307. Analogously, lenslet 305 maps edge rays 301a and 303a onto 301b and 303b on the digital display 307. The optical design aims to guarantee that the clusters do not overlap, which is achieved with maximum use of the digital display when 301b and 302b coincide. The analogous alignment of top clusters 304t, 305t with bottom clusters 304b, 305b, is apparent from FIG. 3.

Because of the partial coincidence of the information on the clusters, ipixel ip1 is formed by the projection of four opixels, op11, op12, op13 and op14. This set of opixels is referred to as the "web" of ipixel ip1. Webs of ipixels located in the center of the virtual screen, such as ip1, contain four opixels each. However, webs of ipixels close to the boundaries of the virtual screen may have fewer opixels. For instance, the web of ipixel ip2 contains only two opixels, op21 and op22, and the web of ip3 contains only op31.

SUMMARY

Refractive optical designs for HMDs with one or more lenslets composed by freeform surfaces which have a plane of symmetry perpendicular to the digital display are disclosed. The digital display is preferably cylindrical (with in general non-spherical azimuthal cross section), the cylinder axis being vertical and perpendicular to the plane of symmetry of the freeform surfaces.

One aspect of a display device comprises a display, operable to generate a real image, and an optical system, comprising one or more lenslets, arranged to generate a virtual sub-image from a respective partial real image on the display, by each lenslet projecting light from the display to an eye position. The sub-images combine to form a virtual image viewable from the eye position. The at least one said lenslet is symmetric with respect to a plane and the display surface is cylindrical with its axis perpendicular to the same plane.

Each said lenslet may be symmetric with respect to the mentioned plane.

The one or more lenslets comprise at least two of the symmetric lenslets.

Where the one or more lenslets comprise at least two lenslets, the respective partial real images on the display may be so arranged that the sub-images combine to form the viewable virtual image as an uninterrupted virtual image of a given image.

At least one lenslet may be arranged to produce a respective partial virtual image that contains a part projected by an eye onto a 1.5 mm fovea of an eye when the eye is at the position of an imaginary eye sphere with its pupil within the pupil range, and that part of each virtual image may then have a higher resolution than a peripheral part.

There are multiple possible configurations of these embodiments depending on the number of lenslets. Preferred embodiments have either one, two or four lenslets. These embodiments can be designed to be used with a single digital display for both eyes, one digital display per eye or two digital displays per eye, and that digital display may be curved.

The optical design is done using two or more freeform surfaces by multi-parameter optimization of the coefficients of a polynomial expansion, preferably using an orthogonal basis. The design requirements are adapted to the human eye resolution for best utilization of the available degrees of freedom. This adaptation implies that the image quality of every ipixel is maximized when the eye is gazing near to that ipixel (i.e. when the peripheral angle under which that ipixel is observed is small), since that ipixel will be imaged by the eye on the fovea. On the other hand, the image quality is gradually relaxed as the peripheral angle gradually increases, because the eye's resolving power decreases considerably at higher peripheral angles.

Another aspect provides a display device comprising a display, operable to generate a real image, and an optical system comprising a plurality of lenslets each arranged to generate a virtual sub-image from a respective partial real image on the display, by each lenslet projecting light from the display to an eye position. The virtual sub-images combine to form a virtual image viewable from the eye position. Each lenslet comprises first and second freeform optical lenses so arranged that light from the display passes through both the first freeform optical lens and the second freeform optical lens to the eye position.

The display device may then comprise a freeform lens that is continuous at least in surface and slope, and that forms the second freeform optical lenses of at least two said lenslets that form distinct virtual sub-images.

The first lenses of those at least two said lenslets that form distinct virtual sub-images may be parts of a single lens separated by at least a break in slope.

Another aspect provides a headgear comprising the display device according to any of the above mentioned aspects, with a mount for positioning the display device on a human head with the eye position of the display device coinciding with an eye of the human.

The headgear may then further comprise a second display device, mounted with the eye position of the second display device coinciding with a second eye of the human. The two display devices may be similar, and may be identical or mirror images of each other.

The display of first eye's display device and the display of the second eye's display device may then be parts of a single display.

DETAILED DESCRIPTION

Figure 1:
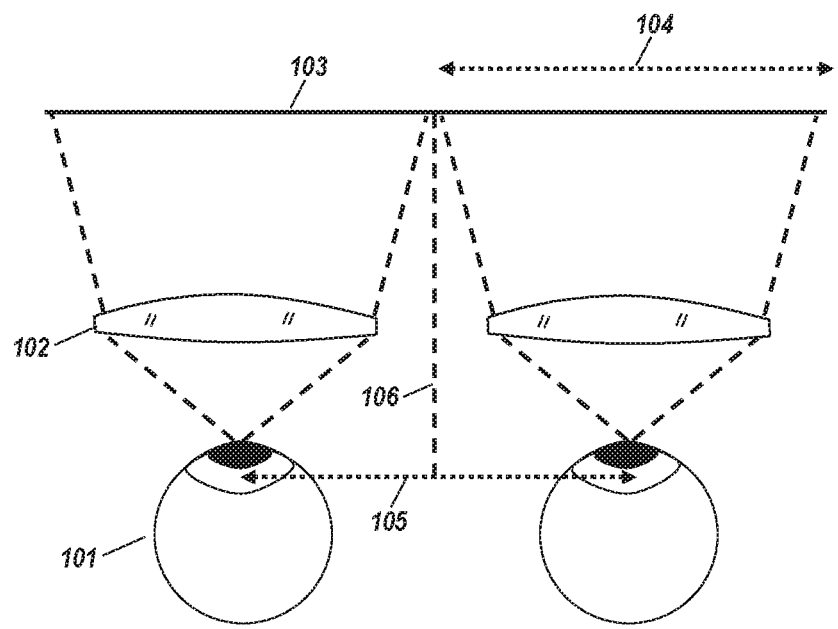
FIG. 1 is a schematic view of an optical configuration composed of 2 rotationally symmetric lenses and one large flat display (prior art).
Figure 2:
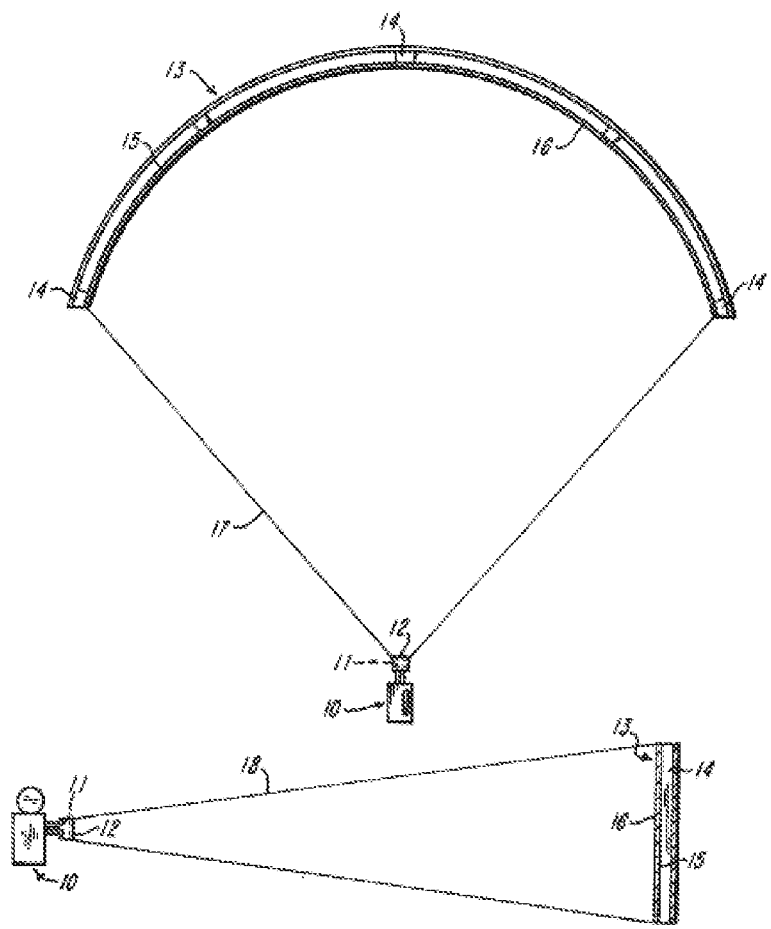
FIG. 2 is a schematic view of a motion picture projecting system (prior art).
Figure 3:
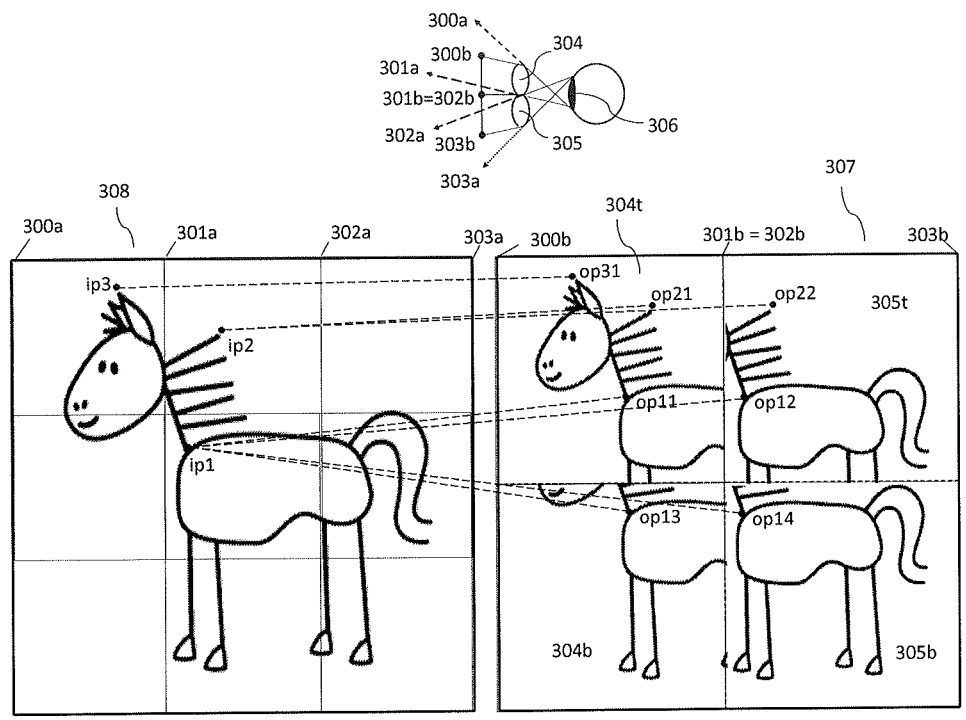
FIG. 3 is a schematic view of ipixels to opixels mapping (prior art).
Figure 4:
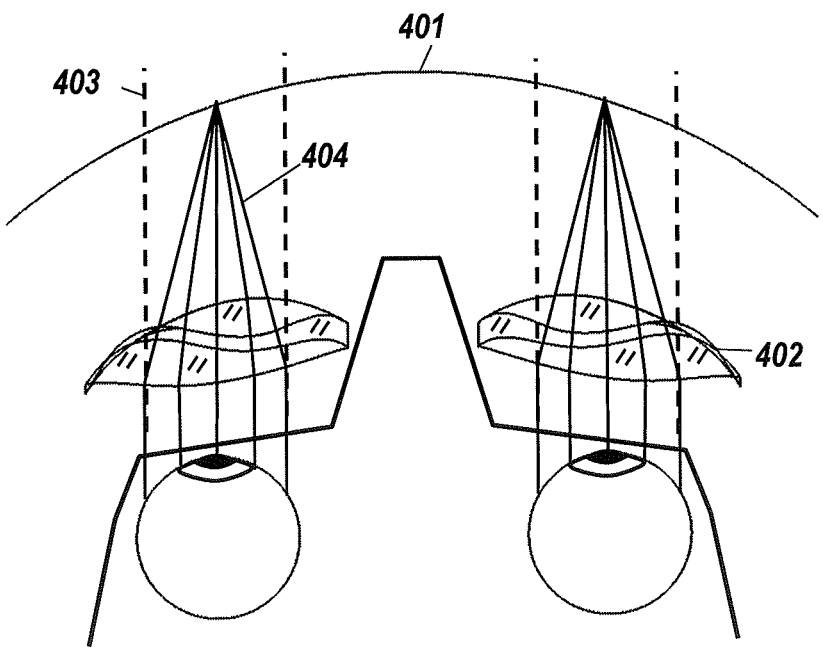
FIG. 4 is a schematic view of an optical configuration that consists of a single lenslet freeform embodiment per eye and one cylindrical digital display.

FIG. 4 shows a schematic view of the top view of one embodiment with a single lenslet freeform design per eye and one cylindrical digital display. The cylinder axis of the digital display is perpendicular to the drawing plane. The digital display is designed to present a cylindrical configuration around the user's head, as suggested by 401. This geometry allows for a more ergonomic and compact device than an analogous design with a flat digital display, because the lateral parts of the digital display are closer to the user's face. Freeform lenses 402, one for each eye, each produce two consecutive refractions of light coming from the digital display. Each of the freeform lenses 402 has a plane of symmetry parallel to the plane of the paper in FIG. 4. Dashed lines 403 indicate the virtual rays traveling from the virtual screen towards the eye sphere, while continuous lines 404 represent the real rays traveling from the digital display towards the eye sphere, which are refracted by both surfaces of the respective lens 402. Freeform lenses shown herein are designed with a similar method to the one described in Section 6.14.1 Annex A and Section 6.14.2 Annex B of PCT1. However, in PCT1 the embodiments using a cylindrical digital display had the cylinder axis parallel to the plane of symmetry of the freeform surfaces, whereas in FIG. 4 the cylinder axis is perpendicular to that plane.

Figure 5:
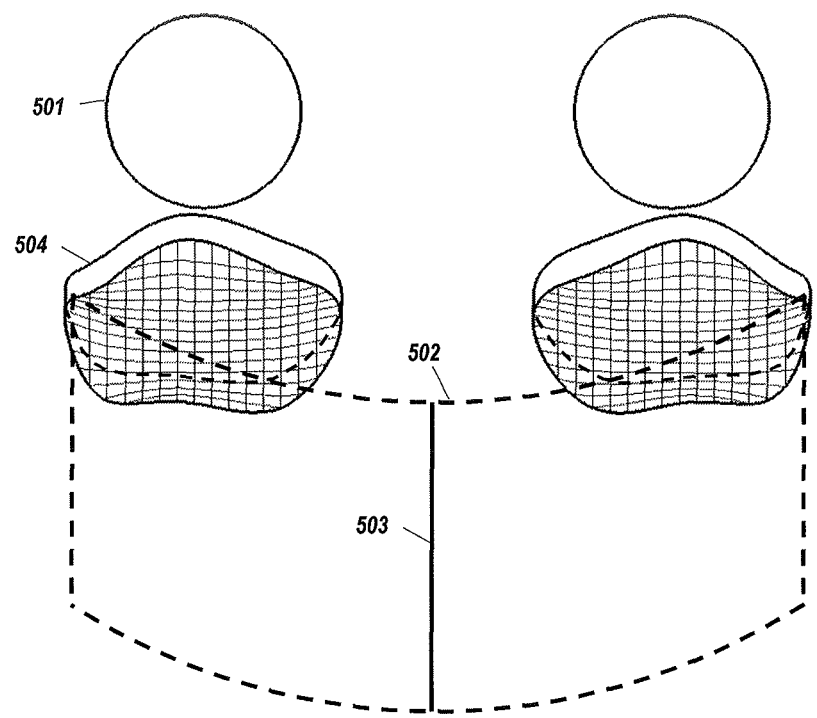
FIG. 5 is an isometric schematic view of the device whose horizontal cross section is shown in FIG. 4.

FIG. 5 is a perspective view of the optical configuration previously shown in 2D in FIG. 4. The digital display 502 is placed frontwards and clearly curve-shaped in the horizontal direction. Line 503 indicates the symmetry axis of the digital display, which divides the display 502 into two halves. Each half of the display 502 works with one of the eyes 501 and its corresponding lens 504. Notice that both refractive lenses are freeform (i.e. no rotational symmetry). This is indicated by the irregular curves of the mesh plotted on the surface S1 of each lens.

An example of this design configuration for a focal length of 45 mm and a curved digital display with a selected circular profile of radius 100 mm (the design not being restricted to this profile) achieves a field of view of 100°.

Figure 7:
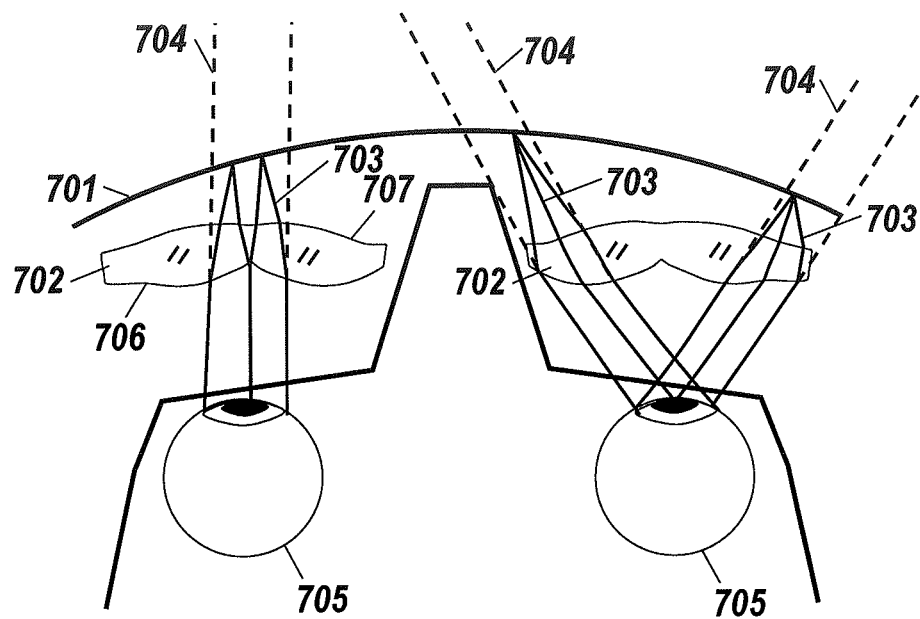
FIG. 7 is a schematic view of an optical configuration of two 2-fold freeform lenses with one cylindrical digital display.

Another embodiment has one 2-fold freeform lens per eye and a single cylindrical display, and is shown in horizontal cross section in FIG. 7. We extend here the single lenslet case shown in FIG. 4 to a 2-fold lens. In general, we may extend it to optical devices that are k-fold (k>2). In contrast to the embodiments disclosed in PCT1, the 2-fold lens in FIG. 7 has a plane of symmetry which coincides with the plane of the cross section, and the axis of the cylindrical display is perpendicular to the symmetry plane of the freeform optics. Alternatively, two separate curved or tilted displays could be used.

Rays exiting the cylindrical digital display 701 suffer two refractions on 2-fold freeform optical devices 702. Dashed lines 704 indicate the virtual rays traveling from the virtual screen towards the eye sphere 705, while continuous lines 703 represent the rays traveling from the digital display 701 towards the eye sphere 705, which are refracted by both surfaces of the optical devices 702 as already mentioned. In general, the two halves of the lens 702 are not symmetric one to the other.

As shown in FIG. 7, surface S2 nearer to the eye (labeled as 706) is designed with a discontinuity in the derivative where the two lenslets meet. An alternative design can be developed with surface S1 further from the eye (labeled as 707) with the cusp (i.e. a derivative discontinuity), while surface S2 is continuous and differentiable. Both surfaces S1 and S2 may be non-differentiable at the same time in an alternative embodiment as well).

Figure 8:
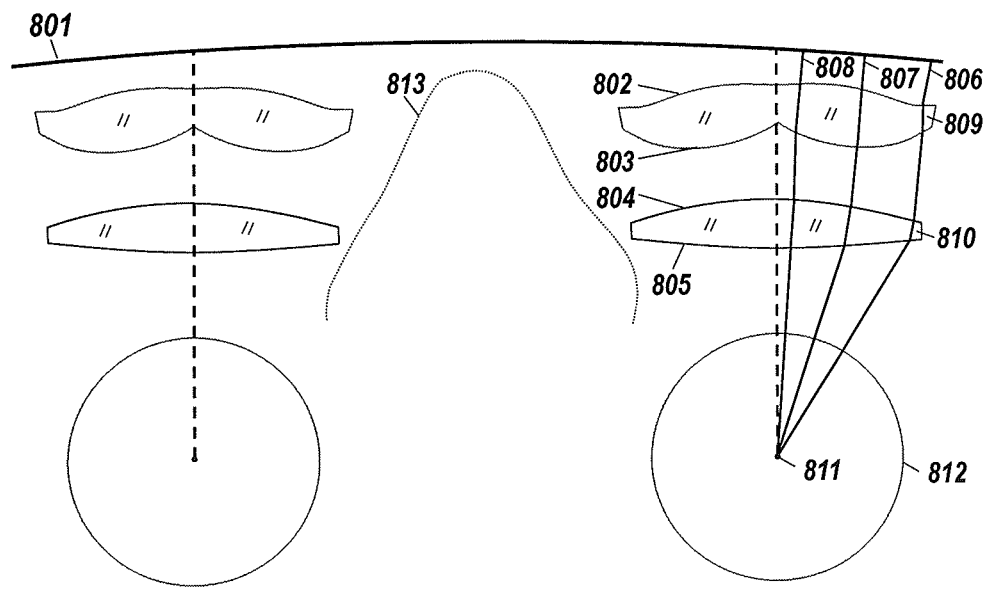
FIG. 8 is a schematic view of an optical system composed of one cylindrical digital display with two lenses per eye: one 2-fold freeform lens and one rotationally symmetric lens.

FIG. 8 shows a 2D cross section of an embodiment with a curved digital display 801 and two lenses per eye: a 2-fold freeform lens 809 and a rotationally symmetric lens 810. Human eye sphere is labeled as 812 and user's nose as 813. As shown in FIG. 8, rays 806, 807 and 808 emitted by the digital display 801 undergo 4 refractions: first they are refracted by both surfaces (802 and 803) of the 2-fold freeform lens 809, afterwards by both surfaces (804 and 805) of the rotationally symmetric lens 810 and finally they are directed towards the eye sphere center 811.

This configuration has 4 surfaces to design, 2 freeform (802 and 803) and 2 preferably rotationally symmetric (804 and 805). The additional degrees of freedom of this configuration provided by the 2 new rotational symmetric surfaces in comparison with the previous embodiment shown in FIG. 7 may be used to obtain a design with optimized resolution, i.e. a design whose focal length varies with the angular direction of the ipixels on the virtual screen. This variation is performed in order to match the human resolution as described in the reference PCT1.

Figure 9:
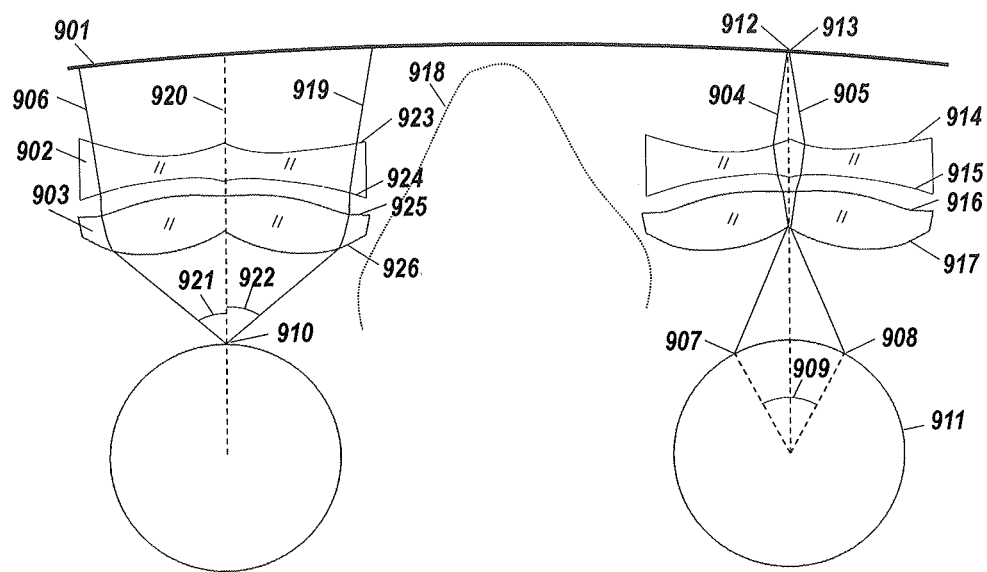
FIG. 9 is a schematic view of an optical system composed of one cylindrical digital display with two 2-fold lenses per eye placed one in front of the other.

FIG. 9 shows a schematic view of a horizontal cross section of an embodiment that consists of two 2-fold freeform lenses per eye labeled as 902 and 903 and placed consecutively between the human eye 911 and curved display 901. Lens 902 is made of a different material from that of lens 903 in order to decrease the chromatic aberration of the whole device. Since there are 4 freeform surfaces to design, this configuration has sufficient degrees of freedom, so they can be employed to control the focal distances, to widen the field of view and to improve the image formation quality in comparison with designs that only present two freeform surfaces per eye, and thus fewer degrees of freedom. Alternatively, surfaces 924 and 915 are made to coincide with 925 and 916, so they can be cemented and freeform doublets are obtained. The cylindrical digital display is labeled as 901. The user's nose 918 and two eye spheres 911 in FIG. 9 are shown for orientation purposes. A 2-fold design is illustrated in FIG. 9, but this configuration can be obviously extended to k-fold optical devices, with k>2.

Ray 906 exits the digital display 901 near its border. Then it is refracted by surfaces 923 and 924 of the freeform lens 902 and later by surfaces 925 and 926 of the freeform lens 903. After 4 refractions this ray is redirected towards the center of the eye pupil 910 when the eye rests looking forward. This ray schematically represents the outer border of the field of view. Ray 919 schematically illustrates the inner border of the field of view. In general, the lenslets of the 2-fold freeform lenses 902 or 903 are not identical, also because the inner angle 922 and the outer angle 921 of the field of view are not symmetrical with respect to the front direction 920. As in the preceding designs, we must guarantee that no optical cross-talk occurs. Rays 904 and 905 coming from the edges of the clusters 912 and 913 (which do not coincide in a single point because a tolerance guard is assumed herein), respectively, refract on surfaces 914, 915 and 916 and then impinge on the cusp of the surface 917 of lens 903. Afterwards, they are redirected towards edges 907 and 908 of the pupil range, respectively, which is defined by angle 909. This design condition ensures that every ray reaching any point inside the pupil range region will not experience optical cross-talk.

Figure 10:
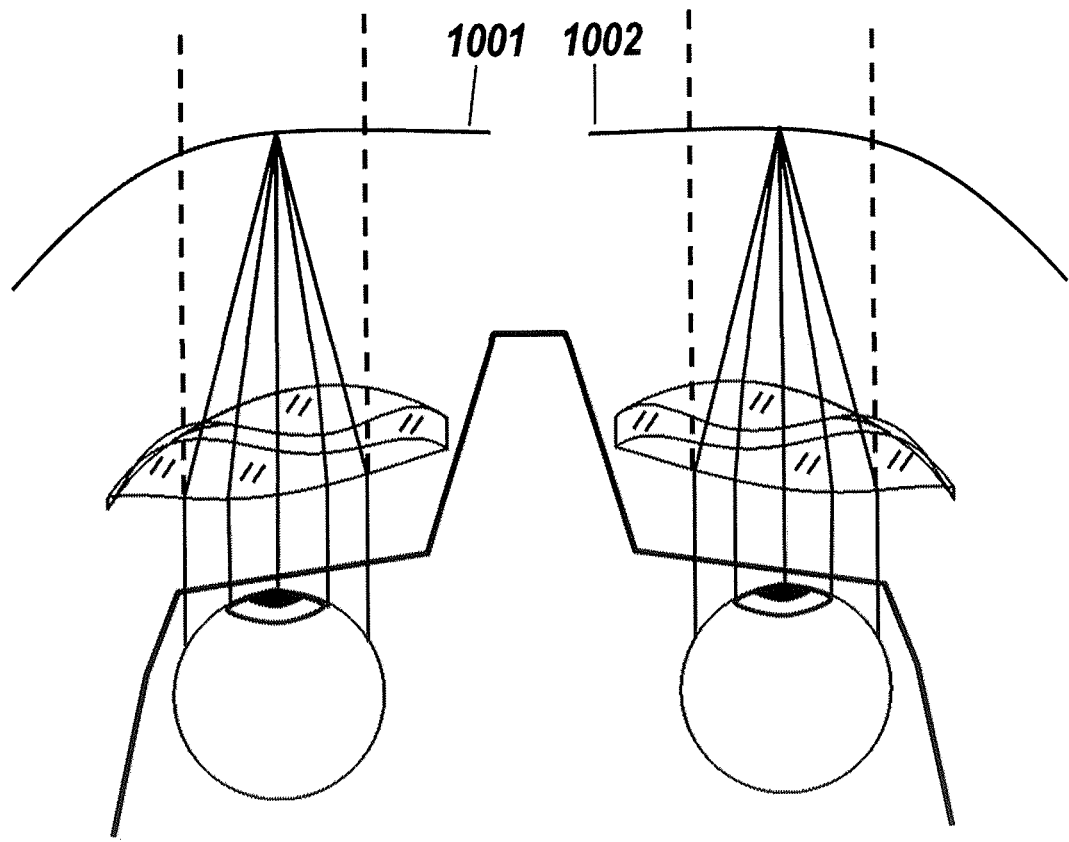
FIG. 10 is a schematic view of a variant of the optical system shown in FIG. 4 with two cylindrical digital displays and two freeform single-lenslet optical systems.

FIG. 10 shows a schematic view of a 2D cross section of another variant of the configuration shown in FIG. 4. Instead of one curved digital display 401 for both eyes, two separated curved digital displays 1001 and 1002 are shown herein, one per eye. This splitting of the curved digital display can also be applied to embodiments shown in FIG. 7, FIG. 8 and FIG. 9.

In FIGS. 4 and 7, the cylindrical display was a circular cylinder. However, the cylindrical displays 1001, 1002 in FIG. 10, are cylinders in the more general sense, partially flat and partially concave towards the eye, with a fairly smooth curve in the curved parts. The axis of the cylinder may be taken as any convenient reference line parallel to the generant.

Figure 11:
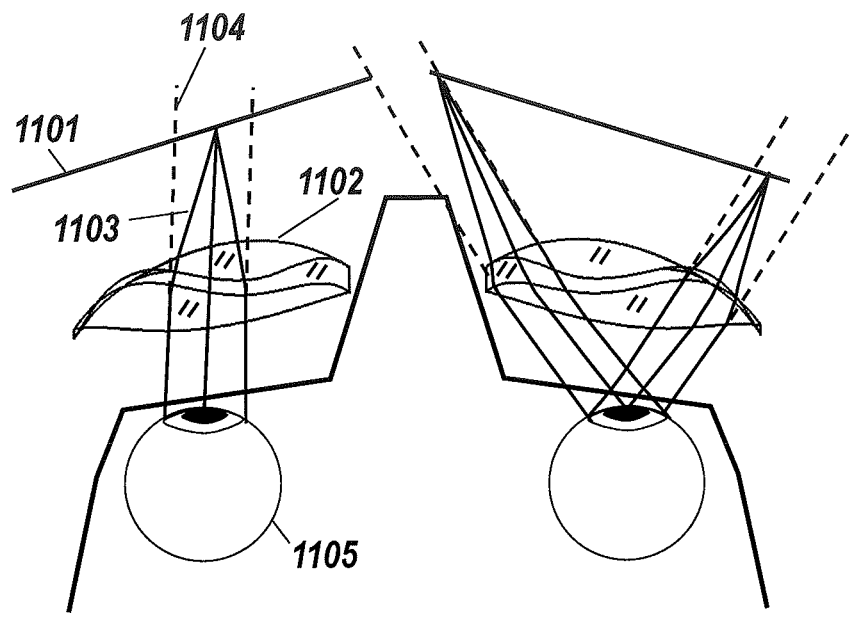
FIG. 11 is a schematic view of a variant of the optical system shown in FIG. 4 with two tilted flat digital displays and two freeform single lenslets.

Thus, we may approximate a cylindrical display architecture to two tilted flat digital displays in order to allow for a more ergonomic and compact device since the lateral sides of the digital display are closer to the user's face, as presented in FIG. 11. Apart from ergonomics, tilting the displays or making them curved can increase the horizontal field of view, increase the image quality, or both at the same time.

FIG. 11 shows a schematic view of a 2D cross section of another variant of embodiments shown in FIG. 4 and FIG. 10. FIG. 4 shows one freeform lens per eye with one large curved digital display. FIG. 10 shows the same lens with two separated curved digital displays (one per eye). FIG. 11 shows a 2D horizontal cross section of two single lenslet freeform designs with two separate flat digital displays tilted inboard-outboard with respect to the front direction when the eye pupil rests looking forward. Dashed lines 1104 indicate the virtual rays coming from the virtual screen towards the eye pupil 1106 on the eye sphere 1105, while continuous lines 1103 represent the rays coming from the digital display 1101 towards the eye pupil 1106, which are refracted by both surfaces of the freeform lens 1102.

Figure 12:
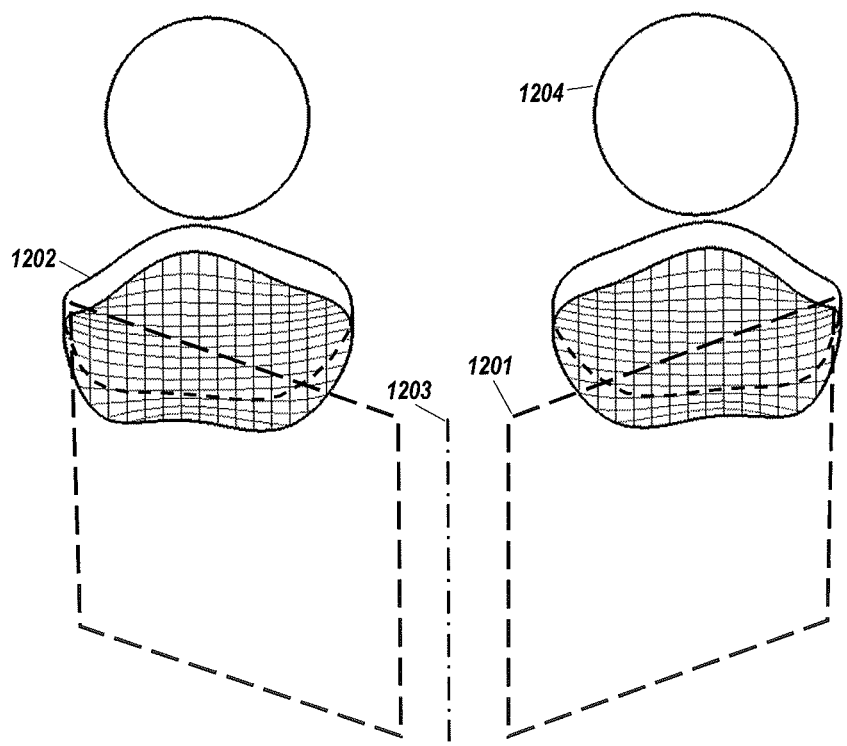
FIG. 12 is an isometric schematic view of the device whose horizontal cross section is shown in FIG. 11.

FIG. 12 is a perspective view of the same optical device shown in FIG. 11, where digital displays 1201 are clearly tilted inwards-outwards with respect to the front direction when the eye pupil rests looking forward. Line 1203 belongs to the plane of symmetry of this configuration. Each digital display works with one of the eyes 1204 and its corresponding lens 1202. Both refractive lenses are freeform. This is indicated by means of the irregular shape of the mesh plotted on the surface S1 of each lens. The lenses may have a plane of symmetry, in particular the cross section with a horizontal plane passing through the eye spheres' centers and containing the 0,0 direction (i.e. the center of the virtual screen).

The field of view of the embodiments shown herein may be enlarged by partial binocular overlapping. For example, the optical system (both lens and display) for each eye in FIG. 10 and FIG. 11 can be rotated outboard an angle with respect to the eye sphere center, for instance, about 5 to 15 degrees. This makes the whole HMD present a better ergonomics, and increases the horizontal field of view by two times that angle. On the other hand, the binocular portion of the field of view is also reduced by two times that angle.

Detailed Example

We disclose herein a particular freeform optical design of a 2-fold lens that works with a curved digital display (i.e. a particular example of the configuration schematically shown in FIG. 7). There are two variants of this embodiment. As mentioned, one of them is illustrated in FIG. 7 where one large curved digital display works with a 2-fold lens and where the two lenslets of the lens are not identical. Another alternative configuration includes two 2-fold freeform lenses with two curved digital displays (one per eye). The two lenslets of the freeform lens are identical if the axis of symmetry of the cylindrical digital display (perpendicular to the cylinder axis) crosses the center of the eye rotation. The freeform lenses have a plane of symmetry perpendicular to the cylindrical display, such that the cylinder axis is perpendicular to the plane of symmetry of the freeform surfaces. Both freeform surfaces of each lenslet have been designed and are described with Forbes Q-polynomials (see reference G. Forbes, Characterizing the shape of freeform optics, Optics Express, Vol. 20, Issue 3, pp. 2483-2499, (2012)).

Any freeform surfaces in three dimensions can be well fitted with the standard equation:

$$z(\rho, \theta) = \frac{c\rho^2}{1+\sqrt{1-c^2\rho^2}} + \frac{1}{\sqrt{1-c^2\rho^2}}$$

$$\left\{ u^2(1-u^2)\sum_{n=0}^{N} a_n^0 Q_n^0(u^2) + \sum_{m=1}^{M} u^m \sum_{n=0}^{N} [a_n^m \cos m\theta + b_n^m \sin m\theta] Q_n^m(u^2) \right\}$$

where $\rho$, $\theta$ and z are cylindrical coordinates; u is defined by $u=\rho/\rho_{max}$, so $0 \leq u \leq 1$; c=1/R, R being a curvature radius; and $Q_n^m(v)$ is the Forbes Q-polynomials of order n in v. All the freeform lenses in this embodiment have, at least, one plane of symmetry perpendicular to the cylinder axis of the digital display. Without loss of generality we can consider that this symmetry plane corresponds to $\theta=0$ deg, implying that coefficients $b_n^m=0$ for all n and m.

Figure 13:
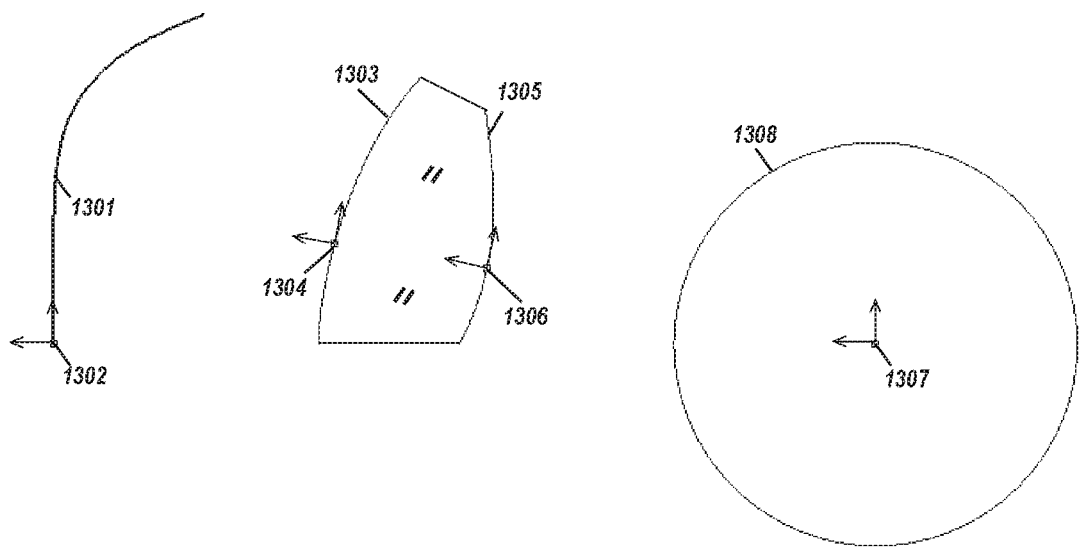
FIG. 13 describes the local coordinate system used to represent the surfaces of one detailed design.
Figure 14:
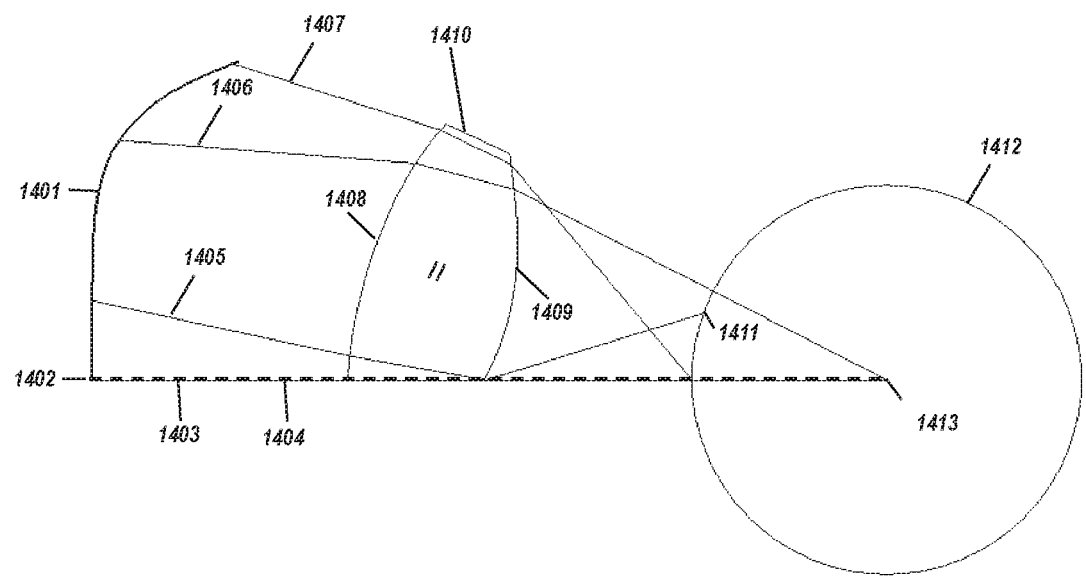
FIG. 14 is the cross-sectional view of the detailed design of FIG. 13, showing some characteristic rays.
Figure 15:
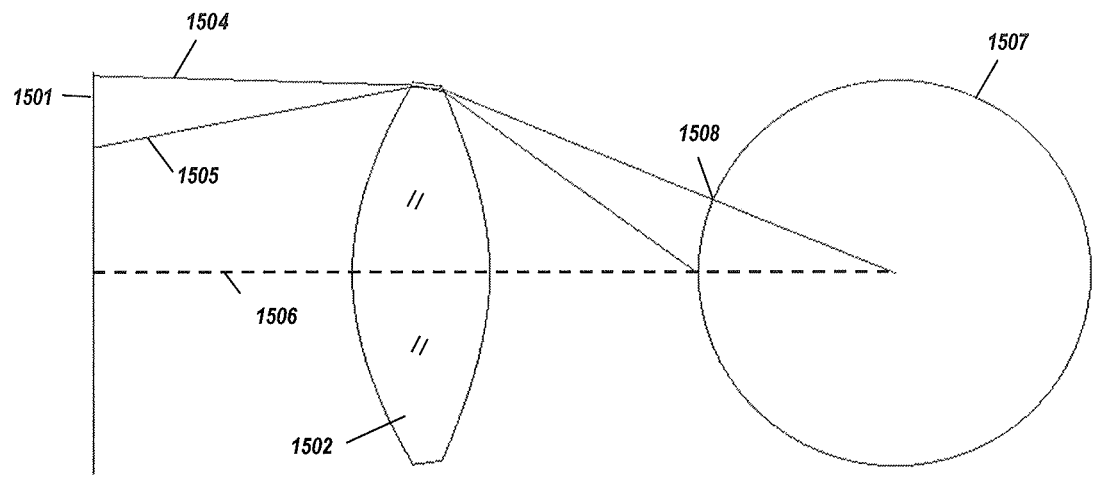
FIG. 15 is another cross-sectional view of the same design in FIG. 14.

Local coordinate systems of each surface used for the polynomial description are shown inthe yz-plane (i.e. x=0, where the z-axis points left and the y-axis points up) in FIG. 13. This figure illustrates one lenslet of the 2-fold refractive optics. Profiles of two surfaces (1303 and 1305) of the lenslet together with the half of curved digital display 1301 and eye sphere 1308 are shown in FIG. 13. We place the center of the global coordinate system 1307 in the center of the eye sphere 1308 $(x,y,z)=(0,0,0)$. Surface S1 labeled as 1303 is described in local coordinate system $x_1y_1z_1$ 1304 that is centered at coordinates $(x,y,z)=(0, 6.31953, 34.1892)$ of the global coordinate system and tilted 10.4312922648424 degrees clockwise around the $x_1$-axis. Local coordinate system $x_2y_2z_2$ 1306 for the surface S2 (labeled as 1305) is centered at $(x,y,z)=(0, 4.8118, 24.5392)$ and tilted 13.5352856790129 degrees clockwise around the $x_2$-axis. As an example of a particular lenslet design with f=22 mm, FoV=100 degs, the non-null coefficients of the lens (all in mm, except c in $min^{-1}$) shown in FIG. 14 and FIG. 15 are given in the following TABLE 1:

TABLE 1

| Parameter | surface S1 | surface S2 |
|---|---|---|
| c | −0.036018769 | 0.039111809 |
| $\rho_{max}$ | 13.41314178 | 14.80122063 |
| $a_0^0$ | −0.226574179 | 1.081278496 |
| $a_1^0$ | 0.282219769 | 0.587066393 |
| $a_2^0$ | −0.183934766 | −0.490052211 |
| $a_3^0$ | 0.062314163 | 0.2240385 |

TABLE 1-continued

| Parameter | surface S1 | surface S2 |
|---|---|---|
| $a_4^0$ | −0.028306575 | −0.05983387 |
| $a_0^1$ | 0.29555848 | 0.665007299 |
| $a_0^2$ | −1.583095327 | −4.806094782 |
| $a_0^3$ | −1.729840066 | −4.655195451 |
| $a_0^4$ | −0.85130362 | −1.065609344 |
| $a_1^1$ | −0.027108396 | −1.838563691 |
| $a_1^2$ | −1.482754987 | 0.201614073 |
| $a_1^3$ | 1.216452316 | 4.499133825 |
| $a_1^4$ | 0.69377578 | 3.171464862 |
| $a_2^1$ | 0.365700671 | 1.816523911 |
| $a_2^2$ | −0.033515118 | −0.828786855 |
| $a_2^3$ | −0.09966736 | −1.617233297 |
| $a_2^4$ | −0.474404363 | −1.442214487 |
| $a_2^5$ | 0.204159827 | 0.46673156 |
| $a_3^1$ | −0.122948506 | −0.722297397 |
| $a_3^2$ | 0.18898364 | 0.590836979 |
| $a_3^3$ | 0.031629265 | 0.506895348 |
| $a_3^4$ | 0.17950827 | 0.4734159 |
| $a_3^5$ | −0.078113732 | −0.183213154 |
| $a_4^1$ | 0.064421065 | 0.241900484 |
| $a_4^2$ | −0.069211879 | −0.170613002 |
| $a_4^3$ | −0.041082485 | −0.115088967 |
| $a_4^4$ | −0.030863378 | −0.060368389 |
| $a_4^5$ | 0.022121753 | 0.040395225 |

The profile of the curved digital display can be prescribed. In this example it has been fixed to the curve given by $$z(y)=2ay^6$$

Where a=−1.46434003091751e-008. The local coordinate system of digital display $x_3y_3z_3$ is placed at $(x,y,z)=(0, 0, 51.9457503)$ of the global coordinate system (see FIG. 13).

FIG. 14 shows the same yz-section of the system, x=0 (where the z-axis points left and the y-axis points up). Half of the complete system is shown in FIG. 14. The other half of the system can be made by a mirror image of the shown lenslet 1410 reflected in the xz-plane that contains axis 1404 (y=0). Another alternative would be that the other half of the system consists of the flat continuation of the display and lenslet that works with a flat display (for more detail see reference PCT1). Obviously, both lenslets should have similar optical characteristics (f, FoV).

We may examine design rays trajectories in FIG. 14. Reversed ray 1403 comes from the border of the pupil range 1411, impinges at the cusp of surface S2 labeled as 1409, refracts on the surface S1 labeled as 1408 and it is sent to the cluster edge 1402. Reverse ray 1405 exits the eye pupil center parallel to the axis y=0 when eye pupil rests looking forward. Reversed ray 1406 comes from the center 1413 of the eye sphere 1412 and it reaches the display. Reversed ray 1407 marks half field of view as it is the border peripheral ray that impinges on the border of the display from the eye pupil when it rests looking forward.

FIG. 15 illustrates the xz-section (plane y=0) of one lenslet belonging to the 2-fold lens configuration also shown in previously described FIG. 13 and FIG. 14. This section is perpendicular to the section shown in FIG. 14. We may appreciate the display labeled as 1501 and user's eye 1507. The lens is labeled as 1502, and it corresponds to lens 1410 in FIG. 14. Reversed ray 1504 marks half field of view as it is the border peripheral ray that impinges on the border of the display from the eye pupil center when the eye rests looking forward. Reversed ray 1505 leaves the eye pupil center when eye pupil gazes near the border of the pupil range 1508.

Figure 16:
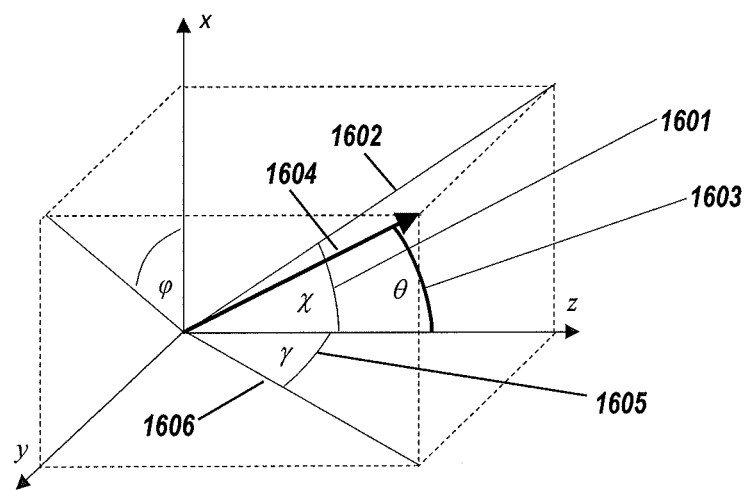
FIG. 16 is a diagram for defining several angles.

TABLE 2 and TABLE 3 show the root-mean-square (RMS) diameters of the polychromatic spots for some selected fields of the design in FIG. 14 and FIG. 15 for a pupil diameter of 4 mm. This design has a focal length of about 22 mm for the front direction and gradually decreases towards the edge of the field of view. Its horizontal field of view is 100 degrees and vertical field of view is 68 degrees for a 2.1" (55 mm) 16:9 display, where the horizontal direction is the given by the y-z plane. Angles χ and γ are illustrated in FIG. 16. χ is defined as the angle 1601 between the projection 1602 on xz-plane of the peripheral angle's θ 1603 direction 1604 and the z-axis, while γ is the angle 1605 between the peripheral angle's θ projection 1606 on yz-plane of the same peripheral angle's θ direction 1604 and the z-axis.

Figure 6:
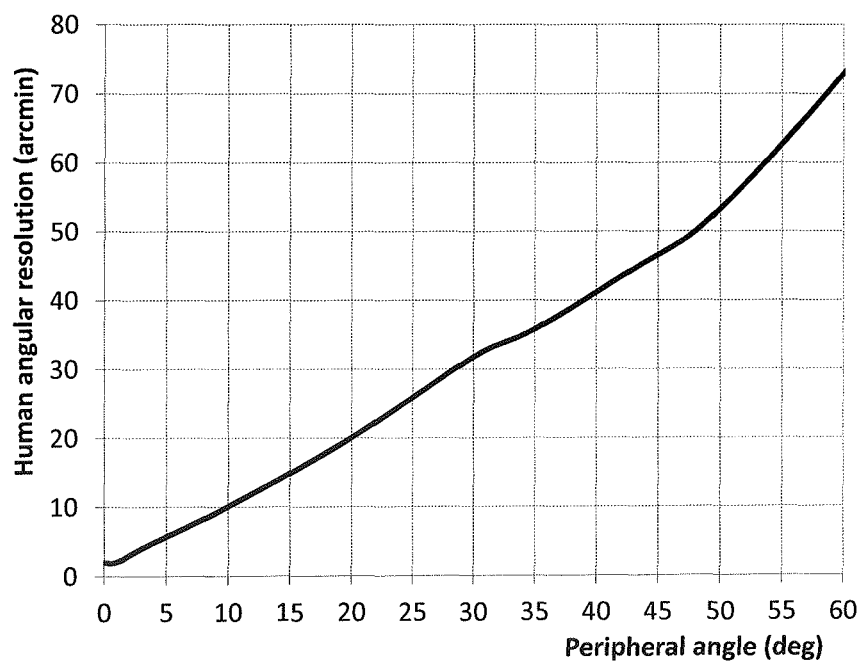
FIG. 6 shows the angular resolution of a typical human eye as a function of the peripheral angle.

FIG. 6 shows the angular resolution of a typical human eye as a function of the peripheral angle (according to J. J. Kerr, "Visual resolution in the periphery", Perception & Psychophysics, Vol. 9 (3), 1971). Since the human eye resolution is much smaller in peripheral vision than close to the gazing direction, we can adjust the design conditions of any of the embodiments in this specification to make the image quality of the ipixels when they are directly gazed (the ipixels on the gazed region of the virtual screen) higher than the image quality of the ipixels when they are not gazed (particularly the ipixels in the outer region of the virtual screen).

TABLE 2 corresponds to the situation when the eye is gazing at each field, so the peripheral angle for the human eye perception is 0 for all the fields, and thus the optical resolution should be maximum. This table shows that opixels as small as 30-40 microns can be resolved well, although the RMS increases to some extent for the highest values of the angle x(deg). This is mainly caused by chromatic aberration.

TABLE 3 corresponds to the situation when the eye is gazing frontwards, so the peripheral angle for the human eye perception is not zero, but equal to θ given by equation $$\theta = \arccos\sqrt{\frac{1}{\tan^2\chi + \frac{1}{\cos^2\gamma}}}.$$

Therefore, the optical resolution can be lower without affecting the human perception of optical quality. This design is adapted to the human eye resolution of FIG. 6 as discussed in PCT1. For this reason, the RMS values are in general much higher in TABLE 3 than in TABLE 2 for the same fields.

TABLE 2

| χ (deg) | γ (deg) | RMS (μm) | χ (deg) | γ (deg) | RMS (μm) |
|---|---|---|---|---|---|
| 0 | 0 | 39.3 | 0 | 18 | 37.3 |
| 0 | 2 | 43.7 | 0 | 20 | 42.2 |
| 0 | 4 | 47.8 | 0 | 22 | 48.6 |
| 0 | 6 | 42.9 | 0 | 24 | 56.5 |
| 0 | 8 | 34.0 | 0 | 26 | 66.4 |
| 0 | 10 | 27.0 | 0 | 28 | 90.4 |
| 0 | 12 | 25.3 | 0 | 30 | 128.7 |
| 0 | 14 | 28.1 | 2 | 0 | 41.1 |
| 0 | 16 | 32.7 | 2 | 2 | 45.3 |
| 2 | 4 | 48.6 | 4 | 20 | 48.5 |
| 2 | 6 | 43.7 | 4 | 22 | 55.2 |
| 2 | 8 | 35.3 | 4 | 24 | 62.1 |
| 2 | 10 | 29.2 | 4 | 26 | 73.6 |
| 2 | 12 | 28.4 | 4 | 28 | 113.8 |
| 2 | 14 | 31.3 | 6 | 0 | 51.2 |
| 2 | 16 | 35.2 | 6 | 2 | 52.0 |
| 2 | 18 | 39.1 | 6 | 4 | 53.0 |
| 2 | 20 | 43.8 | 6 | 6 | 48.3 |
| 2 | 22 | 50.3 | 6 | 8 | 42.7 |
| 2 | 24 | 57.9 | 6 | 10 | 40.1 |
| 2 | 26 | 68.0 | 6 | 12 | 41.6 |
| 2 | 28 | 95.6 | 6 | 14 | 44.5 |
| 4 | 0 | 45.9 | 6 | 16 | 48.1 |
| 4 | 2 | 48.8 | 6 | 18 | 50.7 |
| 4 | 4 | 50.8 | 8 | 0 | 55.8 |
| 4 | 6 | 45.9 | 8 | 2 | 54.3 |
| 4 | 8 | 38.7 | 8 | 4 | 53.8 |
| 4 | 10 | 34.4 | 8 | 6 | 49.9 |
| 4 | 12 | 34.9 | 8 | 8 | 45.9 |
| 4 | 14 | 37.9 | 8 | 10 | 45.1 |
| 4 | 16 | 41.2 | 8 | 12 | 47.0 |
| 4 | 18 | 44.8 | 8 | 14 | 50.0 |
| 8 | 16 | 53.2 | 12 | 6 | 57.5 |
| 8 | 18 | 57.7 | 12 | 8 | 57.6 |
| 8 | 20 | 64.1 | 12 | 10 | 59.0 |
| 8 | 22 | 70.1 | 12 | 12 | 60.5 |
| 8 | 24 | 75.4 | 12 | 14 | 62.4 |
| 8 | 26 | 107.4 | 12 | 16 | 64.6 |
| 10 | 0 | 61.4 | 12 | 18 | 70.0 |
| 10 | 2 | 56.0 | 12 | 20 | 75.8 |
| 10 | 4 | 54.7 | 12 | 22 | 79.0 |
| 10 | 6 | 51.8 | 12 | 24 | 105.3 |
| 10 | 8 | 50.1 | 14 | 0 | 75.2 |
| 10 | 10 | 50.9 | 14 | 2 | 67.8 |
| 10 | 12 | 52.9 | 14 | 4 | 64.9 |
| 10 | 14 | 55.4 | 14 | 6 | 65.5 |
| 10 | 16 | 58.4 | 14 | 8 | 67.6 |
| 10 | 18 | 63.8 | 14 | 10 | 70.0 |
| 10 | 20 | 70.8 | 14 | 12 | 71.5 |
| 10 | 22 | 75.7 | 14 | 14 | 71.8 |
| 10 | 24 | 84.5 | 14 | 16 | 73.8 |
| 10 | 26 | 153.0 | 14 | 18 | 77.8 |
| 12 | 0 | 67.6 | 14 | 20 | 80.0 |
| 12 | 2 | 60.9 | 14 | 22 | 86.4 |
| 12 | 4 | 58.5 | 16 | 0 | 87.6 |
| 16 | 2 | 77.7 | 18 | 12 | 102.3 |
| 16 | 4 | 75.4 | 18 | 14 | 104.7 |
| 16 | 6 | 75.7 | 18 | 16 | 105.9 |
| 16 | 8 | 78.7 | 18 | 18 | 103.4 |
| 16 | 10 | 82.8 | 18 | 20 | 98.4 |
| 16 | 12 | 85.2 | 18 | 22 | 168.7 |
| 16 | 14 | 86.0 | 20 | 0 | 203.6 |
| 16 | 16 | 87.1 | 20 | 2 | 138.2 |
| 16 | 18 | 87.8 | 20 | 4 | 121.4 |
| 16 | 20 | 86.3 | 20 | 6 | 116.2 |
| 16 | 22 | 106.6 | 20 | 8 | 115.8 |
| 18 | 0 | 118.6 | 20 | 10 | 122.8 |
| 18 | 2 | 98.2 | 20 | 12 | 132.2 |
| 18 | 4 | 94.1 | 20 | 14 | 149.8 |
| 18 | 6 | 92.0 | 20 | 16 | 169.5 |
| 18 | 8 | 93.7 | 20 | 18 | 187.1 |
| 18 | 10 | 98.3 | | | |

TABLE 3

| χ (deg) | γ (deg) | RMS (μm) | χ (deg) | γ (deg) | RMS (μm) |
|---|---|---|---|---|---|
| 0 | 0 | 39.5 | 0 | 40 | 128.0 |
| 0 | 2 | 50.8 | 0 | 42 | 170.6 |
| 0 | 4 | 65.5 | 0 | 44 | 241.5 |
| 0 | 6 | 69.2 | 0 | 46 | 325.6 |
| 0 | 8 | 63.2 | 0 | 48 | 412.6 |
| 0 | 10 | 51.1 | 0 | 50 | 532.5 |
| 0 | 12 | 37.0 | 2 | 0 | 41.0 |
| 0 | 14 | 24.7 | 2 | 2 | 51.8 |
| 0 | 16 | 17.1 | 2 | 4 | 66.1 |
| 0 | 18 | 14.4 | 2 | 6 | 69.7 |
| 0 | 20 | 14.1 | 2 | 8 | 63.8 |
| 0 | 22 | 15.0 | 2 | 10 | 52.1 |
| 0 | 24 | 18.7 | 2 | 12 | 38.7 |
| 0 | 26 | 27.0 | 2 | 14 | 27.6 |
| 0 | 28 | 40.2 | 2 | 16 | 21.1 |

TABLE 3-continued

| χ (deg) | γ (deg) | RMS (μm) | χ (deg) | γ (deg) | RMS (μm) | χ (deg) | γ (deg) | RMS (μm) | χ (deg) | γ (deg) | RMS (μm) |
|---|---|---|---|---|---|---|---|---|---|---|---|
| 0 | 30 | 56.9 | 2 | 18 | 18.7 | 12 | 26 | 68.0 | 14 | 20 | 92.0 |
| 0 | 32 | 74.2 | 2 | 20 | 17.5 | 12 | 28 | 75.1 | 14 | 22 | 88.9 |
| 0 | 34 | 89.2 | 2 | 22 | 17.1 | 12 | 30 | 85.3 | 14 | 24 | 87.4 |
| 0 | 36 | 99.7 | 2 | 24 | 19.6 | 12 | 32 | 94.4 | 14 | 26 | 88.6 |
| 0 | 38 | 109.3 | 2 | 26 | 27.3 | 12 | 34 | 97.5 | 14 | 28 | 93.8 |
| 2 | 28 | 40.4 | 4 | 22 | 22.6 | 12 | 36 | 95.8 | 14 | 30 | 100.9 |
| 2 | 30 | 57.2 | 4 | 24 | 22.4 | 12 | 38 | 91.8 | 14 | 32 | 106.1 |
| 2 | 32 | 74.4 | 4 | 26 | 28.7 | 12 | 40 | 103.0 | 14 | 34 | 105.7 |
| 2 | 34 | 89.3 | 4 | 28 | 41.5 | 12 | 42 | 145.5 | 14 | 36 | 97.2 |
| 2 | 36 | 99.5 | 4 | 30 | 58.3 | 12 | 44 | 211.1 | 14 | 38 | 87.9 |
| 2 | 38 | 108.8 | 4 | 32 | 75.3 | 12 | 46 | 290.9 | 14 | 40 | 94.4 |
| 2 | 40 | 127.4 | 4 | 34 | 89.6 | 12 | 48 | 399.6 | 14 | 42 | 134.1 |
| 2 | 42 | 170.0 | 4 | 36 | 98.9 | 12 | 50 | 669.6 | 14 | 44 | 199.4 |
| 2 | 44 | 240.9 | 4 | 38 | 107.4 | 14 | 0 | 72.0 | 14 | 46 | 281.6 |
| 2 | 46 | 324.7 | 4 | 40 | 125.6 | 14 | 2 | 73.4 | 14 | 48 | 415.4 |
| 2 | 48 | 411.7 | 4 | 42 | 168.3 | 14 | 4 | 78.4 | 14 | 50 | 784.5 |
| 2 | 50 | 533.8 | 4 | 44 | 238.9 | 14 | 6 | 80.6 | 16 | 0 | 75.8 |
| 4 | 0 | 45.0 | 4 | 46 | 321.8 | 14 | 8 | 81.2 | 16 | 2 | 74.5 |
| 4 | 2 | 54.6 | 4 | 48 | 409.0 | 14 | 10 | 82.1 | 16 | 4 | 78.4 |
| 4 | 4 | 67.7 | 4 | 50 | 538.2 | 16 | 6 | 81.9 | 18 | 0 | 80.5 |
| 4 | 6 | 71.1 | 6 | 0 | 50.8 | 16 | 8 | 85.6 | 18 | 2 | 75.6 |
| 4 | 8 | 65.6 | 6 | 2 | 58.9 | 16 | 10 | 90.6 | 18 | 4 | 77.2 |
| 4 | 10 | 54.9 | 6 | 4 | 70.1 | 16 | 12 | 97.3 | 18 | 6 | 82.1 |
| 4 | 12 | 43.3 | 6 | 6 | 73.0 | 16 | 14 | 104.7 | 18 | 8 | 89.5 |
| 4 | 14 | 34.7 | 6 | 8 | 68.1 | 16 | 16 | 110.7 | 18 | 10 | 99.4 |
| 4 | 16 | 30.2 | 6 | 10 | 58.9 | 16 | 18 | 114.0 | 18 | 12 | 111.0 |
| 4 | 18 | 27.8 | 6 | 12 | 49.7 | 16 | 20 | 114.3 | 18 | 14 | 122.4 |
| 4 | 20 | 25.3 | 6 | 14 | 43.8 | 16 | 22 | 113.7 | 18 | 16 | 131.7 |
| 6 | 16 | 40.7 | 6 | 36 | 98.0 | 16 | 24 | 112.7 | 18 | 18 | 137.8 |
| 6 | 18 | 38.3 | 6 | 38 | 104.9 | 16 | 26 | 113.8 | 18 | 20 | 141.7 |
| 6 | 20 | 34.8 | 6 | 40 | 122.5 | 16 | 28 | 117.3 | 18 | 22 | 142.5 |
| 6 | 22 | 30.4 | 6 | 42 | 165.2 | 16 | 30 | 121.2 | 18 | 24 | 142.9 |
| 6 | 24 | 27.9 | 6 | 44 | 235.3 | 16 | 32 | 122.2 | 18 | 26 | 144.1 |
| 6 | 26 | 32.3 | 6 | 46 | 317.0 | 16 | 34 | 117.0 | 18 | 28 | 146.1 |
| 6 | 28 | 43.7 | 6 | 48 | 404.9 | 16 | 36 | 104.1 | 18 | 30 | 147.2 |
| 6 | 30 | 59.9 | 6 | 50 | 548.0 | 16 | 38 | 86.5 | 18 | 32 | 144.5 |
| 6 | 32 | 76.3 | 8 | 0 | 57.3 | 16 | 40 | 86.5 | 18 | 34 | 135.1 |
| 6 | 34 | 90.3 | 8 | 2 | 63.2 | 16 | 42 | 123.6 | 18 | 36 | 117.7 |
| 6 | 36 | 98.0 | 8 | 4 | 72.7 | 16 | 44 | 188.5 | 18 | 38 | 95.1 |
| 6 | 38 | 104.9 | 8 | 6 | 75.1 | 16 | 46 | 277.9 | 18 | 40 | 88.5 |
| 6 | 40 | 122.5 | 8 | 8 | 70.9 | 16 | 48 | 460.7 | 18 | 42 | 120.0 |
| 6 | 16 | 40.7 | 8 | 10 | 63.5 | 16 | 50 | 975.1 | 18 | 44 | 184.0 |
| 6 | 18 | 38.3 | 8 | 12 | 57.0 | 18 | 46 | 289.6 | 20 | 42 | 134.1 |
| 6 | 20 | 34.8 | 8 | 14 | 53.5 | 18 | 48 | 568.8 | 20 | 44 | 194.9 |
| 6 | 22 | 30.4 | 8 | 16 | 51.8 | 20 | 0 | 89.8 | 20 | 46 | 339.3 |
| 6 | 24 | 27.9 | 8 | 18 | 49.6 | 20 | 2 | 77.6 | 20 | 48 | 788.2 |
| 6 | 26 | 32.3 | 8 | 20 | 45.6 | 20 | 4 | 75.8 | 22 | 0 | 105.0 |
| 6 | 28 | 43.7 | 8 | 22 | 40.4 | 20 | 6 | 81.0 | 22 | 2 | 83.5 |
| 6 | 30 | 59.9 | 8 | 24 | 36.8 | 20 | 8 | 92.7 | 22 | 4 | 75.6 |
| 6 | 32 | 76.3 | 8 | 26 | 39.7 | 20 | 10 | 108.3 | 22 | 6 | 80.8 |
| 6 | 34 | 90.3 | 8 | 28 | 49.6 | 20 | 12 | 125.4 | 22 | 8 | 96.5 |
| 8 | 30 | 64.7 | 10 | 24 | 49.5 | 20 | 14 | 141.7 | 22 | 10 | 118.1 |
| 8 | 32 | 79.6 | 10 | 26 | 51.7 | 20 | 16 | 155.3 | 22 | 12 | 141.3 |
| 8 | 34 | 91.3 | 10 | 28 | 60.7 | 20 | 18 | 166.6 | 22 | 14 | 163.5 |
| 8 | 36 | 97.6 | 10 | 30 | 72.5 | 20 | 20 | 171.8 | 22 | 16 | 184.1 |
| 8 | 38 | 101.5 | 10 | 32 | 85.0 | 20 | 22 | 175.5 | 22 | 18 | 197.9 |
| 8 | 40 | 117.8 | 10 | 34 | 93.3 | 20 | 24 | 177.7 | 22 | 20 | 208.9 |
| 8 | 42 | 160.4 | 10 | 36 | 96.6 | 20 | 26 | 179.5 | 22 | 22 | 216.5 |
| 8 | 44 | 229.0 | 10 | 38 | 97.0 | 20 | 28 | 180.5 | 22 | 24 | 222.0 |
| 8 | 46 | 310.0 | 10 | 40 | 111.3 | 20 | 30 | 180.9 | 22 | 26 | 225.0 |
| 8 | 48 | 400.3 | 10 | 42 | 154.6 | 20 | 32 | 175.4 | 22 | 28 | 226.0 |
| 8 | 50 | 567.3 | 10 | 44 | 221.2 | 20 | 34 | 163.2 | 22 | 30 | 223.8 |
| 10 | 0 | 63.0 | 10 | 46 | 301.0 | 20 | 36 | 142.6 | 22 | 32 | 216.8 |
| 10 | 2 | 67.2 | 10 | 48 | 397.2 | 20 | 38 | 120.6 | 22 | 34 | 203.8 |
| 10 | 4 | 75.1 | 10 | 50 | 603.7 | 20 | 40 | 110.9 | 22 | 36 | 185.2 |
| 10 | 6 | 77.1 | 12 | 0 | 68.2 | 22 | 38 | 166.5 | 24 | 36 | 248.5 |
| 10 | 8 | 73.9 | 12 | 2 | 70.8 | 22 | 40 | 158.1 | 24 | 38 | 234.9 |
| 10 | 10 | 68.7 | 12 | 4 | 77.0 | 22 | 42 | 173.1 | 24 | 40 | 228.6 |
| 10 | 12 | 65.2 | 12 | 6 | 78.9 | 22 | 44 | 231.7 | 24 | 44 | 262.7 |
| 10 | 14 | 64.0 | 12 | 8 | 77.1 | 22 | 46 | 468.5 | 24 | 46 | 539.9 |
| 10 | 16 | 63.5 | 12 | 10 | 74.7 | 24 | 0 | 122.9 | 26 | 0 | 131.4 |
| 10 | 18 | 62.0 | 12 | 12 | 74.4 | 24 | 2 | 92.9 | 26 | 2 | 107.2 |
| 10 | 20 | 58.3 | 12 | 14 | 75.4 | 24 | 4 | 81.6 | 26 | 4 | 100.3 |
| 10 | 22 | 53.1 | 12 | 16 | 76.8 | 24 | 6 | 86.6 | 26 | 6 | 111.4 |
| 12 | 18 | 76.4 | 14 | 12 | 85.0 | 24 | 8 | 106.5 | 26 | 8 | 134.6 |
| 12 | 20 | 73.5 | 14 | 14 | 89.2 | 24 | 10 | 134.9 | 26 | 10 | 165.9 |
| 12 | 22 | 69.2 | 14 | 16 | 92.4 | 24 | 12 | 164.4 | 26 | 12 | 198.5 |
| 12 | 24 | 66.5 | 14 | 18 | 93.6 | 24 | 14 | 193.1 | 26 | 14 | 233.0 |

TABLE 3-continued

| χ (deg) | γ (deg) | RMS (μm) | χ (deg) | γ (deg) | RMS (μm) |
|---|---|---|---|---|---|
| 24 | 16 | 217.6 | 26 | 16 | 264.9 |
| 24 | 18 | 238.9 | 26 | 18 | 292.6 |
| 24 | 20 | 255.6 | 26 | 20 | 315.4 |
| 24 | 22 | 268.0 | 26 | 22 | 333.2 |
| 24 | 24 | 276.7 | 26 | 24 | 346.1 |
| 24 | 26 | 282.0 | 26 | 26 | 353.8 |
| 24 | 28 | 283.9 | 26 | 28 | 357.9 |
| 24 | 30 | 281.9 | 26 | 30 | 357.4 |
| 24 | 32 | 274.7 | 26 | 32 | 349.6 |
| 24 | 34 | 263.2 | 26 | 34 | 337.8 |
| 26 | 36 | 324.5 | 28 | 36 | 441.3 |
| 26 | 38 | 313.4 | 28 | 38 | 439.4 |
| 26 | 40 | 309.3 | 28 | 40 | 440.8 |
| 26 | 42 | 310.8 | 28 | 42 | 494.7 |
| 26 | 44 | 421.3 | 28 | 44 | 763.2 |
| 28 | 0 | 167.2 | 30 | 0 | 277.1 |
| 28 | 2 | 140.9 | 30 | 2 | 215.1 |
| 28 | 4 | 138.9 | 30 | 4 | 196.5 |
| 28 | 6 | 154.4 | 30 | 6 | 209.8 |
| 28 | 8 | 181.6 | 30 | 8 | 240.8 |
| 28 | 10 | 216.8 | 30 | 10 | 279.7 |
| 28 | 12 | 255.0 | 30 | 12 | 322.9 |
| 28 | 14 | 293.7 | 30 | 14 | 367.4 |
| 28 | 16 | 330.7 | 30 | 16 | 409.9 |
| 28 | 18 | 364.1 | 30 | 18 | 448.8 |
| 28 | 20 | 391.7 | 30 | 20 | 482.0 |
| 28 | 22 | 414.8 | 30 | 22 | 510.5 |
| 28 | 24 | 432.3 | 30 | 24 | 533.3 |
| 28 | 26 | 444.4 | 30 | 26 | 550.9 |
| 28 | 28 | 451.7 | 30 | 28 | 564.4 |
| 28 | 30 | 454.5 | 30 | 30 | 575.1 |
| 28 | 32 | 453.3 | 30 | 32 | 586.8 |
| 28 | 34 | 446.1 | 30 | 34 | 602.9 |
| 30 | 36 | 631.7 | 32 | 10 | 336.9 |
| 30 | 38 | 690.6 | 32 | 12 | 376.2 |
| 30 | 40 | 669.7 | 32 | 14 | 422.5 |
| 30 | 42 | 661.6 | 32 | 16 | 471.7 |
| 30 | 44 | 888.8 | 32 | 18 | 519.1 |
| 30 | 46 | 1570.5 | 32 | 20 | 562.4 |
| 32 | 0 | 615.1 | 32 | 22 | 600.2 |
| 32 | 2 | 476.2 | 32 | 24 | 635.1 |
| 32 | 4 | 384.6 | 32 | 26 | 668.7 |
| 32 | 6 | 334.9 | 32 | 28 | 706.3 |
| 32 | 8 | 320.5 | 32 | 30 | 756.5 |
| 32 | 10 | 336.9 | 32 | 32 | 837.8 |
| 32 | 12 | 376.2 | 32 | 34 | 980.0 |
| 32 | 14 | 422.5 | 32 | 36 | 979.4 |
| 32 | 16 | 471.7 | 32 | 38 | 923.8 |
| 32 | 18 | 519.1 | 32 | 40 | 807.1 |
| 32 | 20 | 562.4 | 32 | 42 | 779.5 |
| 32 | 22 | 600.2 | 32 | 44 | 864.6 |
| 32 | 0 | 615.1 | 34 | 0 | 1371.4 |
| 32 | 2 | 476.2 | 34 | 2 | 1223.6 |
| 32 | 4 | 384.6 | 34 | 4 | 1076.0 |
| 32 | 6 | 334.9 | 34 | 6 | 634.9 |
| 32 | 8 | 320.5 | 34 | 8 | 532.2 |
| 34 | 10 | 494.6 | 34 | 26 | 933.4 |
| 34 | 12 | 483.7 | 34 | 28 | 1145.3 |
| 34 | 14 | 488.9 | 34 | 30 | 1211.4 |
| 34 | 16 | 516.6 | 34 | 32 | 1209.0 |
| 34 | 18 | 561.1 | 34 | 34 | 1181.2 |
| 34 | 20 | 620.9 | 34 | 36 | 1095.2 |
| 34 | 22 | 695.3 | 34 | 38 | 989.5 |
| 34 | 24 | 792.3 | 34 | 40 | 888.8 |

Although specific embodiments have been described, the preceding description of presently contemplated modes of practicing the invention is not to be taken in a limiting sense, but is made merely for the purpose of describing certain general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

The full scope of the invention should be determined with reference to the claims, and features of any two or more of the claims may be combined.

We claim:

1. A display device comprising:
   a display, operable to generate a real image; and
   an optical system, comprising one or more lenslets, arranged to generate a virtual sub-image from a respective partial real image on the display, by each lenslet projecting light from the display to an eye position;
   wherein the sub-images combine to form a virtual image viewable from the eye position;
   wherein at least one said lenslet is symmetric with respect to a plane and the display surface is cylindrical with its axis perpendicular to said plane; and
   wherein the optical system and display are arranged so as to move in combination.

2. The display device of claim 1, wherein each said lenslet is symmetric with respect to said plane.

3. The display device of claim 2, wherein said one or more lenslets comprise at least two said symmetric lenslets.

4. The display device of claim 1, wherein said one or more lenslets comprise at least two lenslets, and wherein said respective partial real images on the display are so arranged that the sub-images combine to form said viewable virtual image as an uninterrupted virtual image of a given image.

5. The display device of claim 1, wherein at least one said lenslet is arranged to produce a respective said partial virtual image that contains a part projected by an eye onto a 1.5 mm fovea of said eye when said eye is at the eye position with its pupil within a pupil range, said part of each said virtual image having a higher resolution when it is directly gazed than when it is not.

6. The headgear of claim 5, further comprising a second display device according claim 1, mounted with the eye position of the second display device coinciding with a second eye of the human.

7. The headgear of claim 6, wherein said display of said display device and said display of said second display device are parts of a single display.

8. A headgear comprising the display device of claim 1, with a mount for positioning the display device on a human head with the eye position of the display device coinciding with an eye of the human.

9. A display device according to claim 1, wherein each lenslet comprises first and second freeform optical lenses so arranged that light from the display passes through both the first freeform optical lens and the second freeform optical lens to the eye position.

10. The display device of claim 9, wherein the first lenses of said at least two said lenslets that form distinct virtual sub-images are parts of a single lens with a continuous profile separated by at least a break in slope.

* * * * *

UNITED STATES PATENT AND TRADEMARK OFFICE
CERTIFICATE OF CORRECTION

PATENT NO. : 10,663,626 B2  
APPLICATION NO. : 15/545633  
DATED : May 26, 2020  
INVENTOR(S) : Pablo Benitez et al.

Page 1 of 1

It is certified that error appears in the above-identified patent and that said Letters Patent is hereby corrected as shown below:

On the Title Page

On the line for the item (73) Assignee:  
Change "Tesseland, LLC, Madrid (ES)" to -- Tesseland LLC, Glendale, CA (US) --

Signed and Sealed this  
Seventh Day of February, 2023

Katherine Kelly Vidal  
*Director of the United States Patent and Trademark Office*